United States Patent
Sanchez Gomez (10) Patent No.: US 6,799,671 B1
(45) Date of Patent: Oct. 5, 2004

(54) AUTOMATIC WAREHOUSE (76) Inventor: Gines Sanchez Gomez, Calle Cervantes, 1, 7, B, Mostoles (Madrid) (ES), 28.932

( * ) Notice: Subject to any disclaimer, the term of this patent is extended or adjusted under 35 U.S.C. 154(b) by 0 days.

(21) Appl. No.: 09/720,931
(22) PCT Filed: Sep. 21, 1999
(86) PCT No.: PCT/ES99/00298
§ 371 (c)(1),
(2), (4) Date: Jan. 2, 2001
(87) PCT Pub. No.: WO00/17072
PCT Pub. Date: Mar. 30, 2000

(30) Foreign Application Priority Data

Sep. 21, 1998 (ES) .......................... P98011989

(51) Int. Cl.[7] .............................. B65G 47/46
(52) U.S. Cl. ................ 198/349.5; 198/349.6; 198/349
(58) Field of Search ................. 198/358, 349, 198/350, 349.6, 349.5, 349.1, 349.7

(56) References Cited

U.S. PATENT DOCUMENTS

| | | | | |
|---|---|---|---|---|
| 3,884,370 A | * | 5/1975 | Bradshaw et al. | .......... 198/350 |
| 3,889,797 A | * | 6/1975 | Naito et al. | ............. 198/350 X |
| 3,915,284 A | * | 10/1975 | Knockeart et al. | .......... 198/349 |
| 4,262,599 A | * | 4/1981 | Ahr | ......................... 198/350 X |
| 5,010,998 A | | 4/1991 | MacMillan | |
| 5,452,786 A | | 9/1995 | Gilmore | |
| 6,028,532 A | * | 2/2000 | Tsurumoto et al. | ..... 198/349 X |

FOREIGN PATENT DOCUMENTS

| | | |
|---|---|---|
| JP | 56103004 | 8/1981 |
| JP | 62036202 | 2/1987 |
| JP | 08058930 | 3/1996 |
| JP | 08295409 | 11/1996 |
| JP | 09020404 | 1/1997 |

* cited by examiner

Primary Examiner—James R. Bidwell (57) ABSTRACT

System capable of being governed entirely by a computer, which permits the complete handling of a warehouse right from the entry of merchandise from suppliers up to its delivery to the customer, in the quantities and types of merchandise that may be specified. This requires the systems of storage and cargo breaking of the invention, which are interconnected in such a way as to permit the integrated handling of goods in the warehouse.

8 Claims, 10 Drawing Sheets

AUTOMATIC WAREHOUSE

CROSS-REFERENCE TO RELATED APPLICATIONS

PCT/ES9900298 application and Spanish patent ES-2153751, being priority.

JP-62036202A. This patent allows that parcels or boxes can be stored in a pallet warehouse.

US-4262599. A type of conveyor system comprising a route network of profile rails, with branching locations, with carts travelling on the rails, having drive devices and a maintenance system.

US-6028532. An annular conveyance path links plural work station and a warehouse for temporary storage of products.

US-3889797. A main conveyor for transporting containers, each container with a plurality of staked pallets with workpieces to be processed, said main conveyor with a plurality of computer-controller subconveyors where workpieces are processed.

US-3884370. System for sorting articles, especially mail pieces.

US-3915284. System for routing assorted items to preselected destination, each item with a readable label.

FIELD OF THE INVENTION

The invention belongs to the technical field of the devices of storage and handling of goods, including the preparation of orders for customers.

BACKGROUND OF THE INVENTION

The current automatic warehouses are pallet warehouses, based on parallel systems of shelves accessed from a linear (not a closed circuit) belt using a crane; therefore, their operation is discontinuous. A variant to this kind of warehouses is the patent JP-62036202A, which allows parcels or boxes to be stored in a pallet warehouse.

Today, in order to prepare orders for customers, the merchandise must be released from the warehouse (whether it is automatic or not), generally in pallets, unstacked and turned into parcels, and even divide these parcels then into other smaller containers. Then, orders for customers are prepared according to various methods using a great range of devices, and the merchandise is finally driven to the delivery area in groups for customers.

All these merchandise-handling processes are mostly done manually.

This invention develops an automatic warehouse to perform in a fillyintegrated and continuous way the storing and order-preparing operations, as well as more usual operations, such as unstacking (pallet and box unstacking) and their subsequent stacking (packing and palletising).

Even though this invention deals basically with the 'hardware' needed to perform the operations mentioned, this 'hardware', as will be demonstrated below, is very appropriate to be computer-controlled, simply by connecting its devices to a computer, which can be easily done through connections that are mostly normalised.

BRIEF SUMMARY OF THE INVENTION

The inventive idea comprises one or several closed circuit conveyor belts for carrying any merchandise along its mechanisms continuously, ever following a pre-fixed direction. On each closed circuit, there is, at least: an entrance, an exit, a positioner, and storage bins. To guide the merchandise to the exit and to storage bins, diverters or baffles are provided in front of both device types. To control the warehouse traffic are label readers at entrance and at exit of each closed circuit belt, and at the entry to each bin.

Each 'storage bin' can be used to store a specific type of merchandise or the merchandise for a specific customer. To take advantage of the space depending on the circumstances, two types of 'storage bins' are proposed: one of horizontal layout based on the storage on a conveyor belt, and one of vertical layout based on the storage on a multi-level elevator. Besides, in order to shorten the paths to the merchandise, especially in the case of multi-level elevators, secondary conveyor belts (branches) are attached to the main circuit equipped with a divertor.

Because customers can make orders in pallets, boxes and/or packets, other devices are designed, such as a depalletizer, a box emptier, and a positioner. Other devices, such as packers and palletizer, can be attached next to the system's exit. The depalletizer is placed in front of the 'closed circuit conveyor belts' for boxes, and the box emptier is placed in front of the 'closed circuit conveyor belts' for packets. Accordingly, the packer is placed behind the 'closed circuit conveyor belts' for packets and the palletizer is placed behind the 'closed circuit conveyor belts' for boxes or behind the packer.

In many cases, the number of 'closed circuits' can be reduced by using the same 'closed circuit' for boxes and packets, just by placing a box emptier on the 'closed circuit'. However, it is impossible to integrate pallets and boxes on the same 'closed circuit' easily, because the depalletizer cannot work on a conveyor belt. Therefore, a minimum configuration would consist of a unique 'closed circuit', accessed through a depalletizer, merchandise is massively stored in boxes and there is a box emptier on its 'closed circuit'. The output would be done through an packer and a palletizer placed subsequently.

For any operation with any merchandise, the merchandise is placed on a 'closed circuit conveyor belt', whether from the entrance to the warehouse, from other 'closed circuit' equipped with an unstacking element or any 'storage bin' of the 'closed circuit'. At the exit of a 'closed circuit', must be a divertor or baffle that allows the merchandise to be diverted to the exit.

Once the merchandise is on a 'closed circuit', to store, the output divertor is closed, and the diverters of the bins with space for the current type of merchandise or customer order are opened.

To recover merchandise from a bin, the bin is actuated. For making up orders, they must be done by type of merchandise and kind of package. The merchandise to be served is discharged onto the belt system, with the exit blocked. It is then considered that they are storage operations on bins assimilated to customers.

The whole system permits an easy control by a computer, only connecting each device to the computer.

DETAILED DESCRIPTION OF THE INVENTION

The invention is described according the figures.

Figure 1:
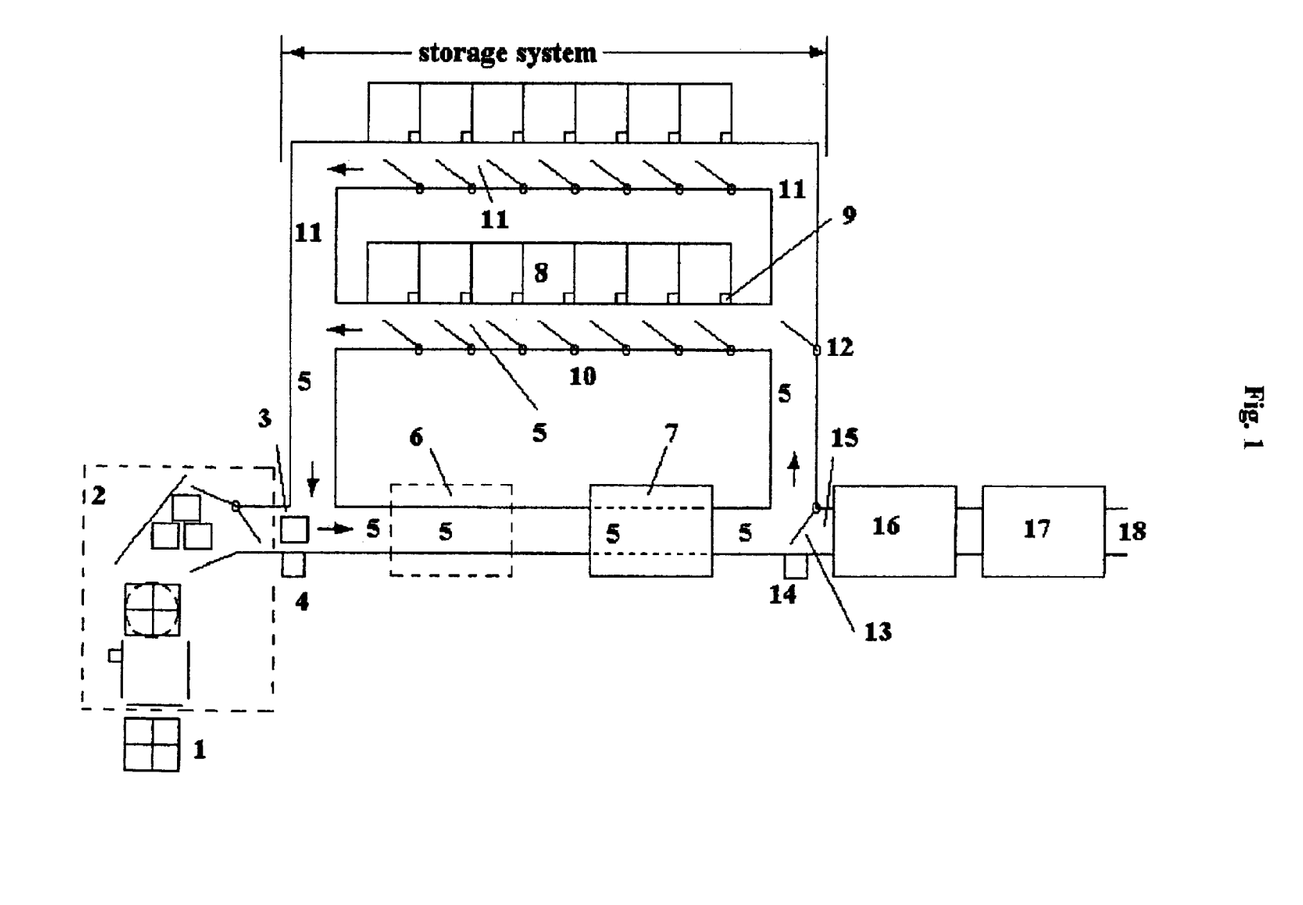
FIG. 1. Basic configuration scheme of a automatic warehouse showing closed circuit conveyor belt, branch belt, storage bins, baffles, depalletizer, pallet emptier, box emptier, positioner, packer, palletizer....

FIG. 1. A basic configuration is diagrammatically represented.

In this warehouse, the palletized goods from supplier enter by the input 1 though a depalletizer 2, exiting as boxes to a storage system, said storage system having a input conveyor belt 3, a input label reader 4, a closed conveyor belt circuit 5 that ever runs in a fixed direction (arrows), a positioner 7, storage bins 8, bin label readers 9, bin baffles 10, secondary conveyor belts (branch belts) 11 with more storage bins, branch baffles 12, being the boxes mass stored on the storage bins, a exit baffle 13, a exit label reader 14 and a exit conveyor belt 15. On the closed conveyor belt of said storage system is placed a box emptier 6. The merchandise leaves the storage system, departing via the exit baffle 13 for a packer 16, controlled by the exit label reader 14 that starting up or shutting off the packer 16 according to its reading to transform packets into boxes if necessary, and a palletizer 17 to transform boxes into pallets, exiting said pallets by the outlet 18.

Figure 2:
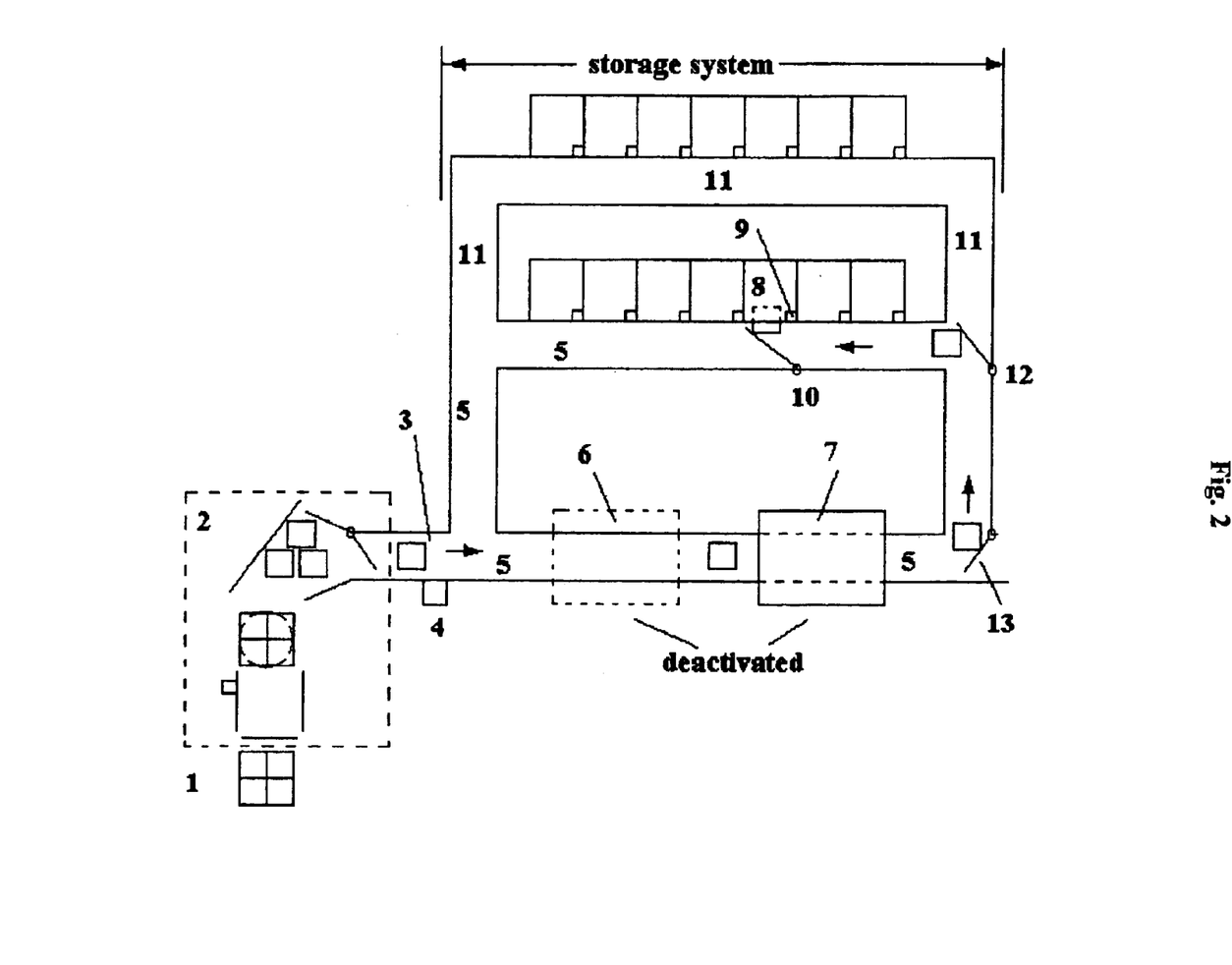
FIG. 2. Storing goods into the storage system.

FIG. 2. For storing goods into the storage system, the goods enter at the input belt 3, passing by the input label reader 4, either from a supplier or else from another part of the warehouse. The goods are placed on the closed conveyor belt 5 (in the drawing with one branch belt 11, although there could be as many branch belts as there is room for in the warehouse). At this stage the exit baffle 13 shuts off access to the exit, forcing the goods to continue on the conveyor belt 5.

Let us suppose that the storage bins can hold various cargo units, although for reasons that will be seen in some of their designs every bin should hold only one type of merchandise.

All the baffles 10 of the bins 8 that have space will remain open, diverting the merchandise introduced towards the first bin with an empty space. When the cargo enters one bin, the label reader 9 that records entry is energized, it actuates the internal movement of the goods in the bin, and transmits input details to the computer: bin branch number, bin number, type of goods, type of pack. If none of the bins of the branch belt had an empty space for the goods in question, the baffle of the branch belt 12 would be closed, permitting passage to a next branch belt or the closed conveyor belt until an empty space is found.

This would be the system default operating system.

Figure 3:
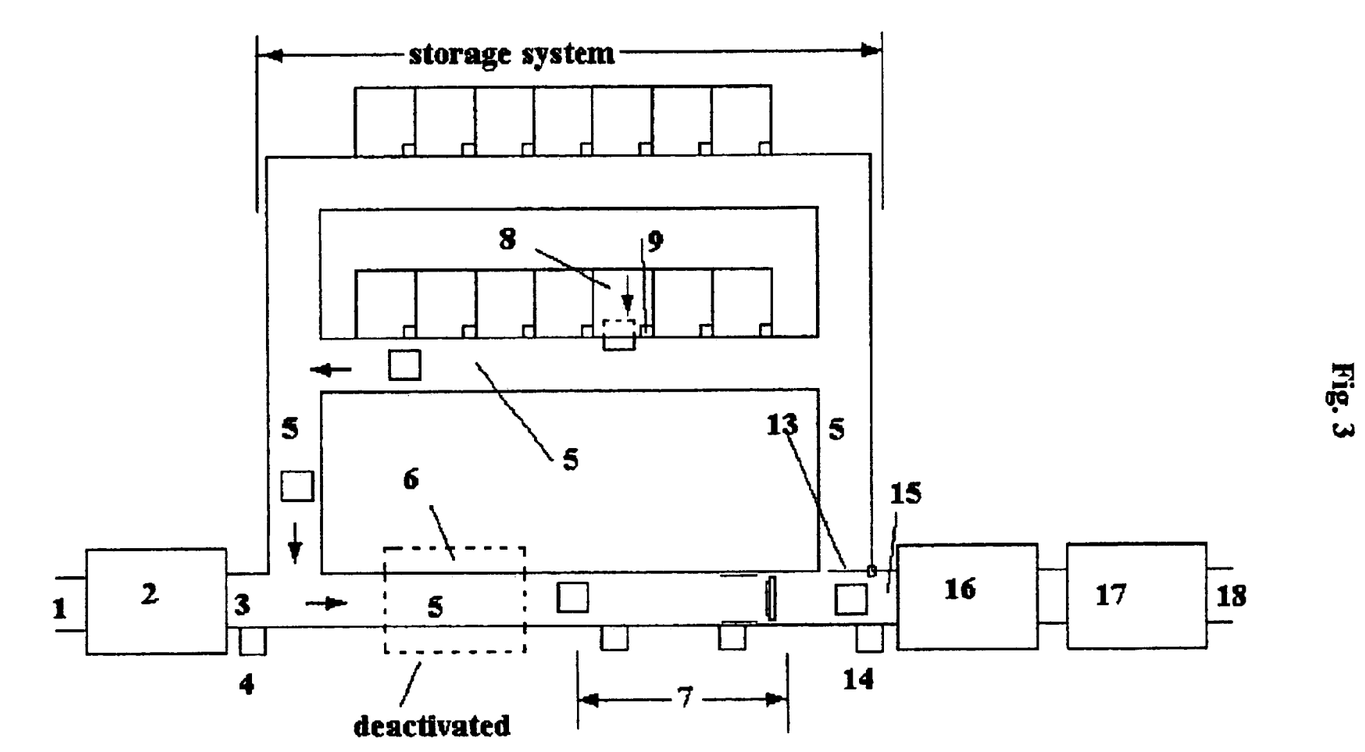
FIG. 3. Recovering goods from the storage system.

FIG. 3. For recovering goods from the storage system the computer will not enable this mode until it has completed any intake operation in progress, which it will detect because the sum of inputs counted by the input label reader 3 is higher than the input at the bins measured by the bin label readers cell 9, so input a should be shut off until withdrawal is completed.

In this withdrawal stage the exit baffle 13 permits the goods circulating on the closed belt to pass to the exit belt 15. When the bin with the right goods 8 is given the order to discharge a unit, this is emptied onto its branch belt or the closed belt 5, finally leaving by the exit belt 15 after first passing in front of the label reader 14, which lets the computer know that the operation has been completed.

Figure 4:
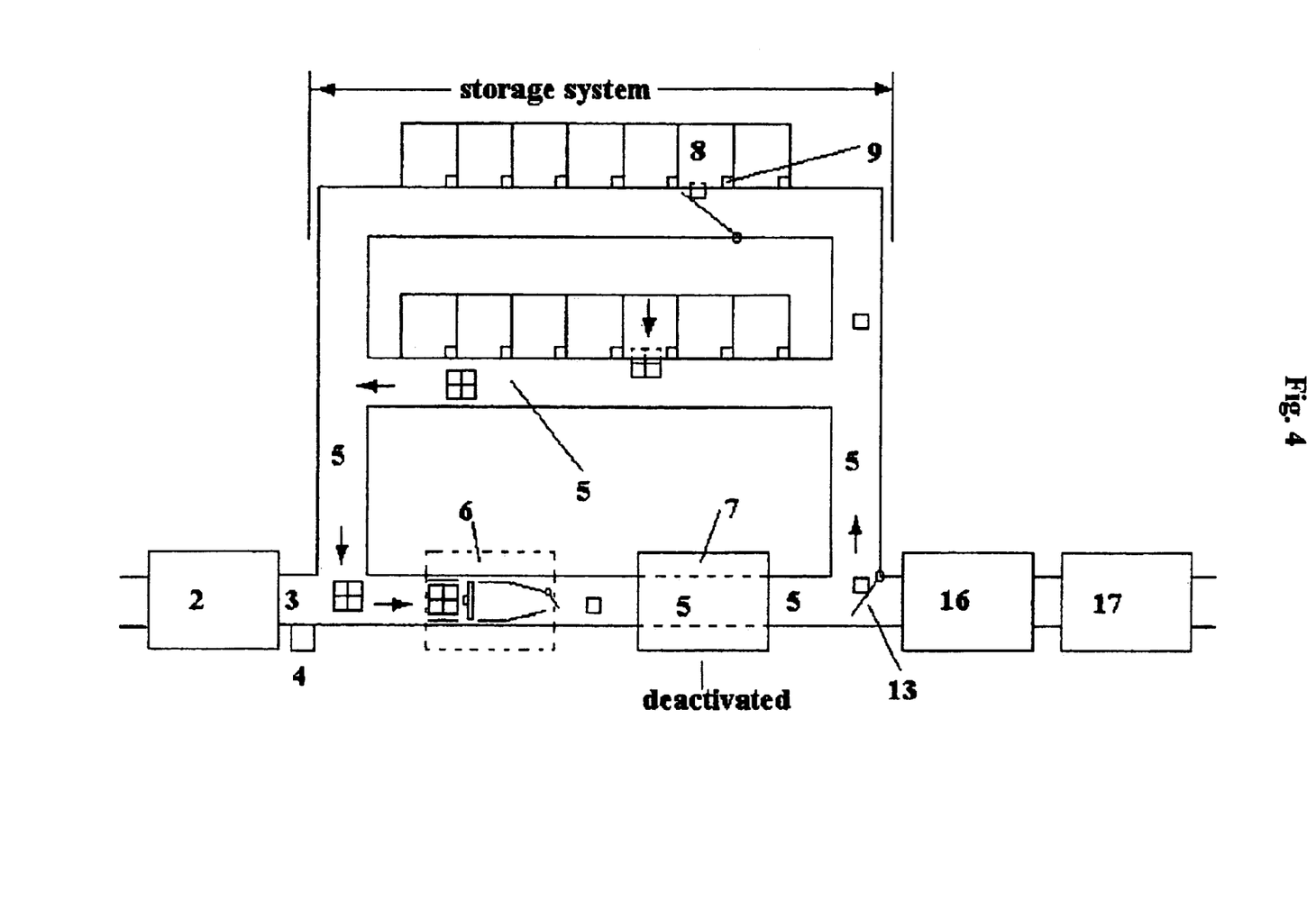
FIG. 4. Internal movements and making up client orders into the storage system.

FIG. 4. For internal movements and making up client orders into the storage system always will assume that the system is governed by a computer, to consider the capacity of the bins, we will suppose that it has three series of variables: one in which the real total capacity is stored, another in which a total virtual capacity is stored, and lastly the contents of each bin, only taking into account for the operations the virtual capacity, which for instance for the intake stage will be zero for bins occupied by goods different from those that are to be stored, and the difference between the real total capacity and the occupancy for the goods to be stored.

The internal movements consist of the passage of goods from one given bin to another given bin.

For this purpose the withdrawal operation is performed and, as soon as the goods are out of the bin, an intake operation, zeroing all the virtual capacities of all the bins except that of the one to which we want to direct them.

It is possible to made internal movements from bins with its merchandise in boxes to bins with its merchandise in packets, by starting the box emptier 6.

For preparation of orders for customers, they will be considered to be made up on the actual storage system (which would mean that the warehouse space is utilized to full advantage).

The client's orders would be made up in boxes and/or packets. To obtain packets from boxes, the boxes are previously placed from bins on the closed conveyor belt circuit, being started the box emptier, then the packets are provisionally stored as boxes.

The computer would first determine the number of bins that every client needs (rounding up) and reserve them, matching up with each order (one order=one client) the number of bins he needs, preferably at the last branch belts.

Afterwards, the computer proceeds to serve the orders by type of goods, i.e. the process that will be described below will be repeated as many times as there are types of goods to be served.

The computer orders the emptying of the merchandise from the bin with the desired merchandise, with the exit baffle 13 preventing issuance from the closed belt, until the capacity of closed conveyor belt 5 is saturated or the bin is emptied, or else all the merchandise of the type in question are used up.

Immediately afterwards, it would give the intake order, with the virtual capacities of all the bins at zero, except those of the clients who have ordered this type of merchandise.

The operation that is started in the second preceding paragraph is repeated as often as necessary for a whole type of merchandise to be served.

Here we see the advisability (rather than the necessity) that only one type of merchandise should be stored at the pure intake stage as, if this were not the case and the type of merchandise needed were in a bin in the middle, it would be necessary to carry out internal movements to reposition the merchandise in place before they are needed. In addition, this would complicate the computer program.

Figure 5:
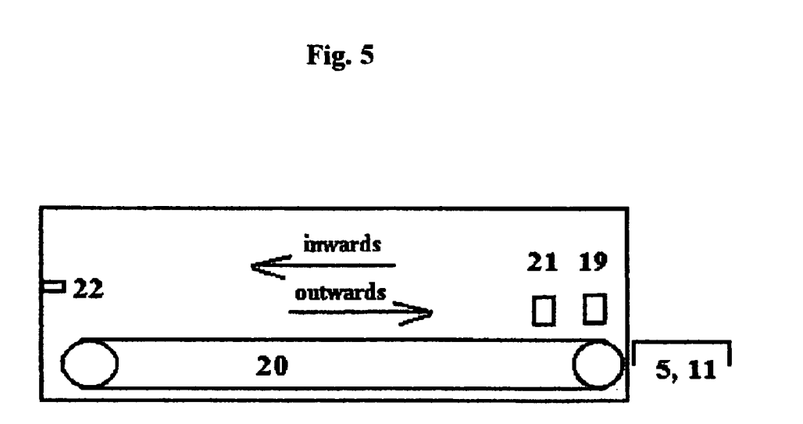
FIG. 5. Storage bin, horizontal configuration, showing a lineal conveyor belt as storage mechanism.

FIG. 5. This figure shows the storage bins with a horizontal configuration.

Goods entry:

The goods enter from the closed conveyor belt or one branch belt 5, 11, actuating the label reader 9 (FIG. 1), and a first photoelectric cell 19, which starts up a inner bin conveyor belt 20 in a inward direction. When the goods reach a second photoelectric cell 21, this stops the belt. At the end of the storage bint a switch stop 22 advises the computer that the bin is full, although the computer must already have its capacity stored in its memory, which is determined by the length of the inner bin conveyor belt divided by the distance between the first and second photoelectric cells.

Goods departure:

The computer starts up the inner bin conveyor belt in an outward direction, pushing the goods to the the closed conveyor belt or one branch belt. The actual bin halts the movement of the inner bin belt when the first photoelectric cell ceases to detect the goods, after they pass in front (actuating it) of the bin label reader 9 (FIG. 1).

Figure 6:
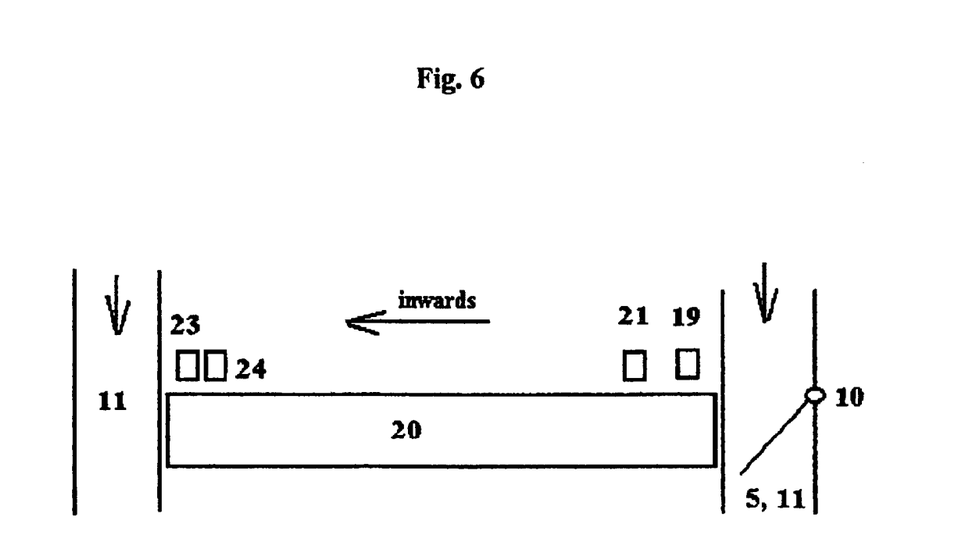
FIG. 6 Another storage bin with horizontal configuration.

FIG. 6. Another alternative configuration to the above is that the goods should leave from the back, dropping onto one branch belt 11. In this case, the bin is opened at its end, therefore not having switch stop but having to be provided with an end label reader 23 and a third photoelectric cell 24 that performs the same function as the first photoelectric cell when the exit of merchandise.

Figure 7:
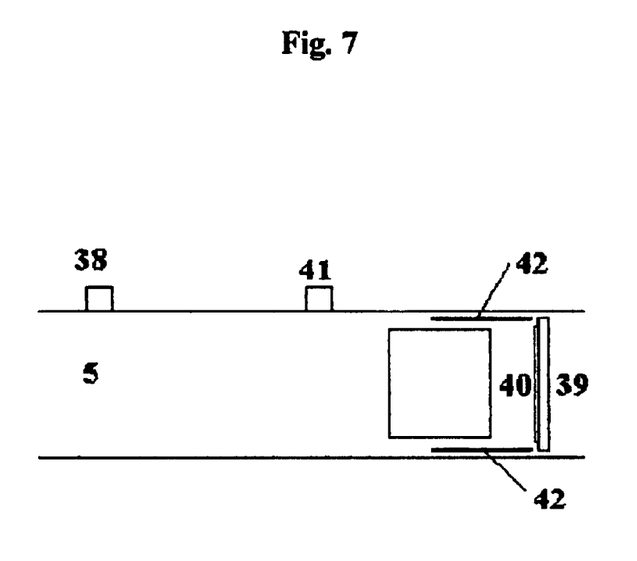
FIG. 7. Storage bin, vertical configuration, showing a elevator with stages as storage mechanism (transveersal view).
Figure 8:
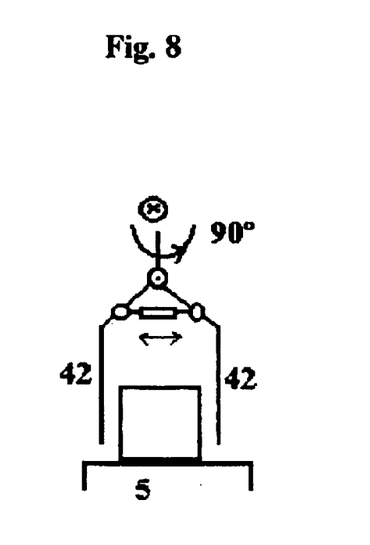
FIG. 8. Storage bin, vertical configuration (first level view).

FIGS. 7–8. The figures show the storage bin with a vertical configuration. The storage bin has four slip rails 25 along which the platforms 26 slide. When these are not occupied, they remain at rest in the pit 27. These platforms are joined together by way of extending unions 28.

Goods entry:

The cargo enters from the closed conveyor belt or branch belt 5, 11 being detected by the bin label reader 9, which sets the entry stop 29 in place that holds back the load momentarily. At the same as the establishment of this entry stop 29 the motor 30 starts up that raises the platform by means of cable 31, until any of the latch type anchorages 32 is reached, shutting off the motor (they also act as switches). At the same time as the motor stops, the entry stop 29 rises, permitting the entry of the goods, pushed by an input piston 33 , to the bin. When the cargo reaches the enter switch 34, the operation is terminated, placing the system on stand-by. When the bin is full, the top of the highest platform should actuate the stop switch 22, transmitting this information to the computer, although this should already know it through the number of platforms present in each pit.

Goods departure:

A piston 35, situated on the same side as the enter switch 34, pushes the cargo outwards, until that the cargo touches the closed belt or one branch belt, these being what will carry the cargo along thereafter.

After a pre-set time , the anchorages 32 are released at the same time as brake 36 is applied to the braking wheel 37, enabling the cable to lower slowly. After a pre-set time, sufficient for the platforms to overrun the anchorages that were securing them, the anchorages are actuated again, halting the platforms at the lower stage.

Figure 9:
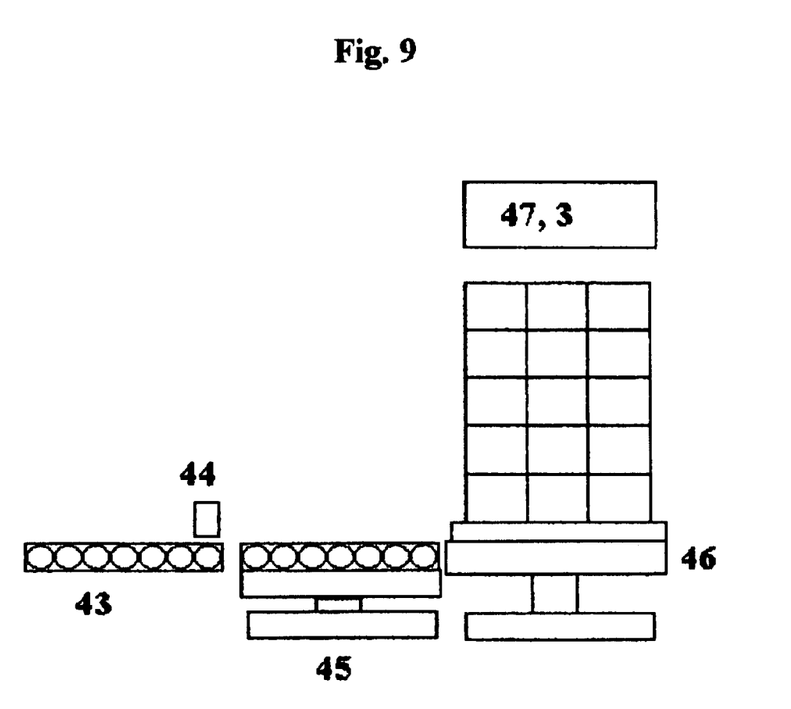
FIG. 9. Positioner (longitudinal view).
Figure 10:
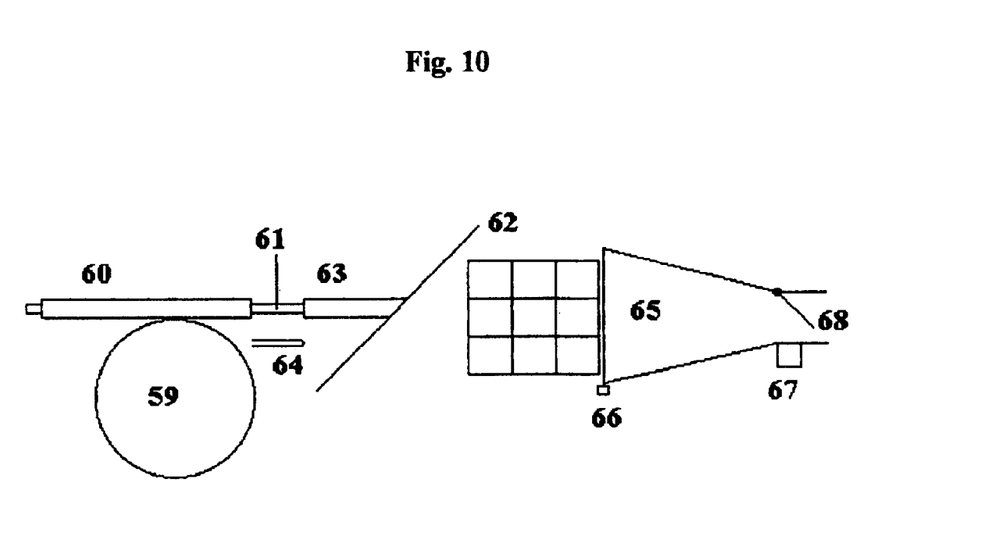
FIG. 10. Positioner (frontal view).

FIGS. 9–10. The figures show the positioner. The cargo moves along the closed conveyor belt 5. On passing by the photoelectric cell 38, a bar 39 with a switch 40 lowers. When the cargo passes by a label reader 41, if reading is correct, the bar with switch rises, the device is placed on stand-by and the cargo moves on, as the fact of the reading indicates that the merchandise is in the correct position.

Otherwise, when the merchandise comes up against the bar with switch, it is momentarily held back, two clamp shovels 42 that hold the merchandise are actuated and raise it, turning it through 90 degrees (in either direction providing that it is the same), and they deposit it again in front of the photoelectric cell 38, setting the system on stand-by again.

Positioning is only considered in the belt plane dimension, as it is not deemed necessary to do so in other dimensions because the starting merchandise, assumed to be on pallets, is presumed to be positioned properly on the same plane and all the handling operations mentioned in this text take place on the plane of a belt.

Figure 11:
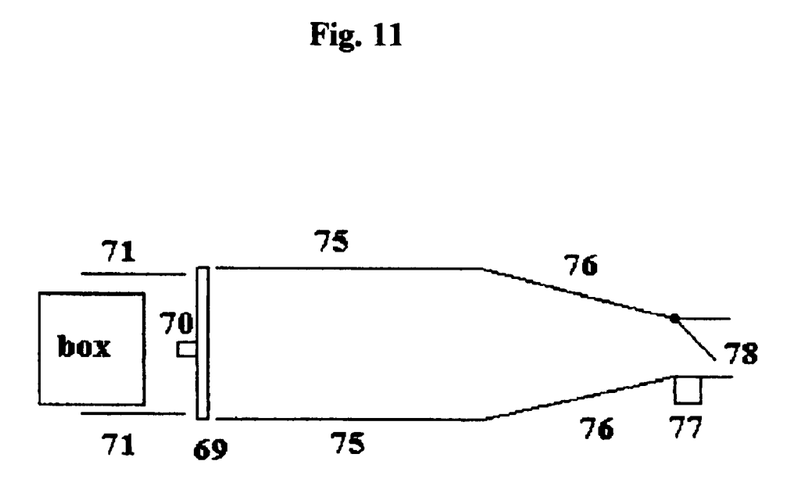
FIG. 11. Depalletizer, general scheme.

FIG. 11. This figure shows the depalletizer. It is assumed that the pallet is banded with plastic and that a label is attached to the pallet proper with the bar code that identifies the goods, the number of boxes and their arrangement on the pallet (dimensions, number of rows, height of each row, etc.).

The pallet is assumed to be placed on a roller conveyor 43, fitted at the end with a label reader 44. Once the pallet is placed on the roller conveyor, it is carried towards the debander 45. The reading taken by the label reader 44 is transmitted to the computer, which undertakes control of the operation. The debander consists of a roller platform, capable of transmitting via these rollers to the next stage. It will be described in greater detail later on.

Once debanded, the pallet is pushed towards the adjustable lifting platform 46. On this the pallet is raised row by row by the computer on the basis of the data that it possesses on it stored in its memory, so that each row is placed in front of the emptier 47, which pushes each row onto the input conveyor belt 3 (FIG. 1) to the storage system. The emptier and the input conveyor belt belt are situated on a plane transverse to the afore-mentioned items.

Not shown in the figure for the sake of clarity and not claimed, the lifting platform should have an empty pallet ejector, perpendicular to the plane, and a conveyor belt that takes them to where they are needed (to the loading area, if they have to be returned to the supplier, or to the unloading area for reuse).

We describe below in greater detail the following items: debander 45, cutter for removing the banding plastic, the function of which will be described in the debander, and the pallet emptier 47.

Figure 12:
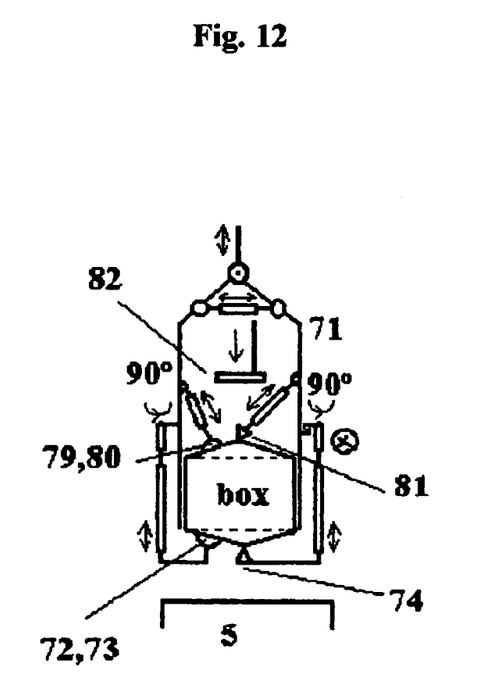
FIG. 12. Debander.

FIG. 12. This figure shows the debander. It is a roller platform 48, provided with anchorages 49 for securing the pallet. This platform can revolve under the action of a rotor 50, on some bearings 51. On one side is a vertical guide 52 along which a suitable cutter 53 for tearing the banding plastic, which will be described later, can slide.

There is an aspirator 54 on the platform.

Its operation would be as follows:

The pallet is secured to the roller platform by the anchorages.

The cutter sinks into the base of the banding, i.e. at the bottom of the guide, while the platform begins to turn, so that the banding is broken at the base. When this is completed, the platform stops turning and resumes its initial position. The cutter slides up to the top of the guide, still sunk in the plastic, so that it breaks one side of it. Afterwards, it is lowered and retracts to be in position for the next pallet.

Finally, the aspirator sucks up the plastic, now loose.

Figure 13:
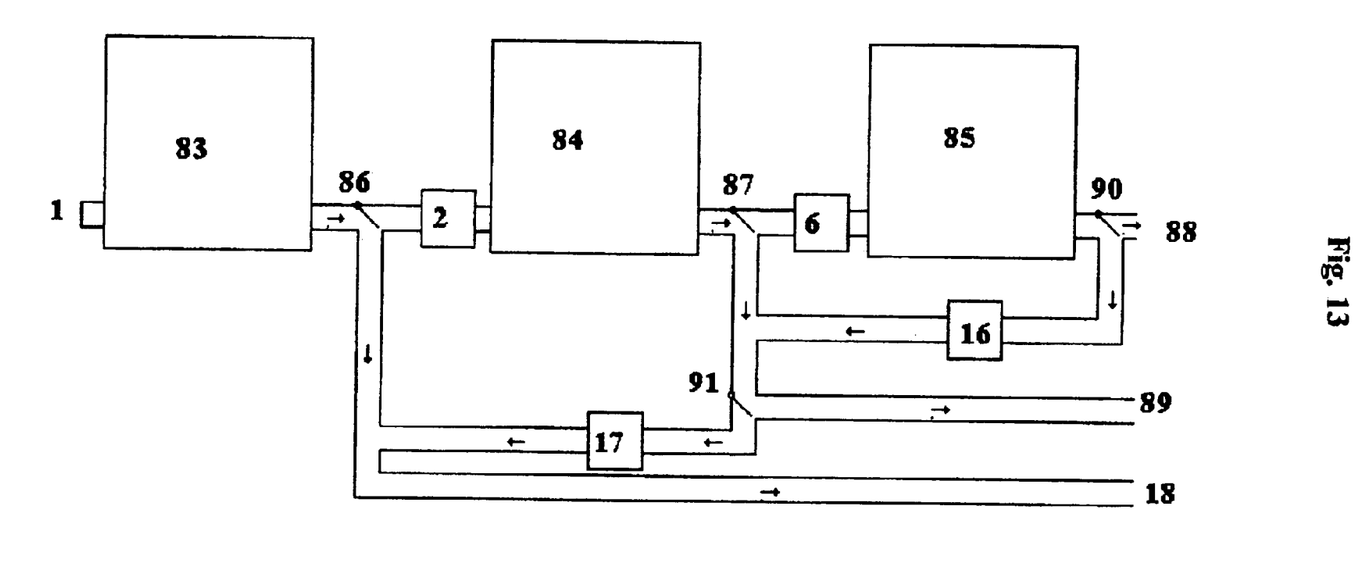
FIG. 13. Debanding cutter.

FIG. 13. The figure shows the debanding cutter. It consists of a handle-spring 55 fixing it to the guide 54 (FIG. 12), a heater coil 56, a tetrahedral shaped cutter 57 proper made of a soft metal (e.g. copper), a inner tube 58, which passes through the cutter.

The cutter penetrates and cuts the plastic more by the heat to which it is subjected by the heater coil than with its tip and edge. The temperature of the cutter should be midway between the melting point of the plastic and the combustion point of the packing of the boxes inside the pallet, otherwise this cutter could not be used.

The mechanism for the penetration of the cutter in the plastic would consist in the relaxation of the handle-spring with only force enough to pierce the plastic but not the box pack.

Coinciding with penetration, air or nitrogen (if there is risk of combustion) would be injected through the hole in order to assist the separation of the plastic from the goods.

FIG. 10. The figure shows a pallet emptier. A cog wheel moved by a motor 59 acts on the internally threaded worm screw 60, to which a shaft 61 is fitted that pushes a shovel 62 against the top row of the pallet. The shaft ends in a spring 63, so that when there is a blockage that holds back the shovel, the shaft continues moving forward until it actuates the switch 64 that moves just as the shaft of the worm screw, which would stop the motor of the cog wheel until the spring relaxes again.

The shovel pushes the last row of the pallet onto a vibrator belt 65 until it comes up against a second switch stop 66, which would invert the direct of travel of the motor of the cog whell, withdrawing the shovel to its starting position, which enables the lift to raise the pallet one more row in order to begin a fresh cycle.

The function of the vibrator belt 65 is to prevent blockages.

When a box passes by a photoelectric cell 67, it closes the gate 68 for a pre-set time, sufficient to achieve a certain spacing between two consecutive boxes.

FIGS. 12–13. Said figures show the box emptier. All the mechanisms have to be situated on the closed conveyor belt 5 (FIG. 1).

When the computer orders the energizing of the box emptier, the first thing this does is to lower the stop 69, provided with a switch 70 that advises the system of the impact of a box against it and stops it. When this happens, the two clamp shovels 71 lower that raise the box just enough to permit the attachment of two suckers 72, 73 under it, which pull the bottom of the box, allowing a cutter 74 to pass in between, which slits the bottom without damaging the goods it contains. The box is then slowly raised, allowing the packets inside to drop onto the closed conveyor belt 5 by gravity. The vibrating bars 75 prevent jams, while the narrowing bars 76 (also vibrating) channel the goods.

When a photoelectric cell 77 detects the passing of a packet, it closes a gate 78, so that the packets may leave the device evenly spaced, in a similar way to the end section of the depalletizer.

When the photoelectric cell counts the number of packets that the box contains (which the computer knows by its bar code), the clamp shovels withdraw the empty box from the circuit and set the device on stand-by.

If gravity is not sufficient to remove the packets due to the type of pack, the box should be opened at the top (in the same way as the bottom) and the load pushed down slowly. By this, the box emptier has at its top another pair of suckers 79, 80 and cutter 81 to open each box, and a ram 82 to push the packets down.

FIG. 13. This figure shows a automatic warehouse with secondary stores for boxes and packets. The palletized goods from suppliers enter to a pallet storage system 83, which will be the one that support the mass storage of merchandise. A box storage system 84 and a packet storage system 85 are secondary for making up orders in these units and will only house the left-overs from previous operations, saving emergencies (as they may also be used for storing general cargo, although in its type of unit of course).

When the time comes to make up customers orders for distribution, the computer determines the totals in boxes and packets, per type of merchandise. By difference with what there is stored in the storage systems of boxes and packets, it obtains the number of boxes necessary, and from these the number of pallets, rounding up in both cases.

The computer positions a first baffle 86 so that the merchandise moves from the pallet storage system to the box storage system, passing by the depalletizer 2, the required number of pallets of each merchandise.

Once the total number of boxes and packets is stored into the box storage system, similarly, the computer positions a second baffle 87 so that the merchandise to be served in packets moves to the packet storage system by way of the box emptier 6.

When all the goods are in each store, the orders are then made up in the three stores according to the order preparation routines, the same in the three cases.

When the orders are made up, they are withdrawn one by one. The merchandise may leave in the three units: packets (exit 88), boxes (exit 89) and pallets (exit 18), the baffles 90 and 91 being the ones to channel the goods to the packer 16 and the palletizer 17, respectively.

Other.

Between basic configuration and store with two ancillary stores, different needs or economic resources available may give rise to different configurations. A slightly more complex configuration than the above would be one that had a specific order make-up store for palletized goods.

Non-computer-controlled warehouse.

In all cases systematic mention has been made to the action of a computer, restricting the description to mentioning the mechanisms and the items that may be connected up to it.

However, with the right control items, which will be described in this section, this system is suitable for manual and semi-automatic control, while the presence of a computer is necessary for fully automatic control due to the complex nature of the system.

A manual system can be achieved easily by allocating a counter to every photoelectric cell or label reader, and a switch to every bin actuating baffle. The readers and switches may be mounted on a panel that simulates the configuration of the warehouse, e.g. FIG. 1 itself could serve as a model. In addition, it should have suitable pilot lights that announce the operations as they are carried out.

A semi-automatic control could enable the operator to perform global operations without having to concern himself with control, e.g. the intake stage could be programmed at the outset with a logic system in which every bin had a button and there was a "feed" button. Every bin baffle would be opened by an AND logic gate if the button of that bin, the feed button, is depressed and if the difference between the capacity of a bin and the counter is positive. The baffle of a branch of belt (b) would be opened by an OR logic gate, at which the bin baffle opening/closing would be detected, as well as the result of this gate and of the feed button, as entry to another AND gate, the outcome of which would be the one that opened or closed the aforesaid baffle.

In fact, a good design of this system would first involve an operating design in manual and semi-automatic mode, making the connection with the computer by way of the control panel. But this is left for a possible later addition. Depalletizer manual and automatic control.

As in the case of the storage system, the depalletizer is presumed to be controlled by a computer. Otherwise considerable automation may be achieved per type of goods, for which purpose the key item is the pallet lift. All the other components can achieve automatic movement sequences with the afore-mentioned switches and label readers, besides a system that blocks the entry of pallets until an operation is terminated.

The pallet lift should be capable of rising an initial height (that required to bring the top of the pallet up flush with the vibrator conveyor belt 65 (FIG. 10) and fixed steps, governed by a counter, the maximum value of which would be the number of rows on the pallet. These are precisely the data that have to appear on the control panel.
Remark.

The constitution of the conveyor belts has not been mentioned. These should naturally be suitable for the cargo. Thus, if this is on pallets, roller conveyors should be used. If in boxes or packets, more classic leather, plastic, canvas, etc. belt conveyors would be sufficient.

What is claimed is:

1. An automatic warehouse for storing packed goods, said goods being provided with bar codes or magnetic labels, the automatic warehouse being controlled by a computer which controls the movements of the goods in the warehouse, the automatic warehouse comprising a depalletizer, a closed belt, a packer and a palletizer, the automatic warehouse having a box emptier and a positioner on the closed belt, the closed belt connecting a belt entrance from the depalletizer, a belt exit to the packer and storage bins, the storage bins being arranged in said closed belt and in branch belts from said closed belt to the same closed belt, the automatic warehouse further comprising baffles being provided in front of the belt exit, in front of the storage bins and in front of the branch belts, the automatic warehouse furthermore comprising label readers at the belt entrance, the belt exit and at the entry to each bin.

2. An automatic warehouse according to claim 1, characterized in having consecutively a closed belt for pallets, the depalletizer, a closed belt for boxes, the box emptier, a closed belt for packets and a packet exit, the automatic warehouse further comprising the palletizer, the packer, the pallet exit, a box exit, a packet exit and conveyor belts and baffles connecting these devices, where the packer is between the the closed belt for packets and the box exit, the palletizer is between the the closed belt for boxes and the pallet exit and also the palletizer is between the packer and the pallet exit.

3. The automatic warehouse of claim 1 or 2, characterized in that each storage bin storing various units of merchandise, the storage bin extending perpendicular to the closed belt of the storage system and having an inner conveyor belt, a first photoelectric cell and a second photoelectric cell at the input of the bin, and a limit switch at the end of the bin, such that as the merchandise enters, the first photoelectric cell activates the inner belt, causing the inner belt to rotate inwards, whereas the second cell stops it, while in order to release the merchandise out of the bin, the control computer actuates the bin by causing the inner belt to rotate outwards until the first photoelectric cell does not detect the goods.

4. The automatic warehouse of claim 3, characterized in that the storage bin only rotates inwards, having an output label reader and an output photoelectric cell at the bin end, exiting the merchandise by this end on one of the branch belts when the computer actuates the inner belt, stopping the inner belt when the output photoelectric cell does not detects the merchandise.

5. The automatic warehouse of claims 1 or 2, characterized in that the depalletizer is suitable for placing boxes on a pallet on the closed belt, with the boxes in spaced by action of a photoelectric cell and a gate.

6. The automatic warehouse of claim 1 or 2, characterized in that the box emptier is suitable for placing packets of a box on the closed belt, the box emptier having a stop provided with a switch actuates the box emptier.

7. The automatic warehouse of claim 1, characterized in that the positioner is actuated when a photoelectric cell detects the passing of a merchandise and no reading takes place at a label reader in an interval of time from when the merchandise was detected by the photoelectric cell.

8. A computer-contolled method for storing and preparing client orders of packed goods, said packed goods provided with bar codes or magnetic labels, comprising storing and recovering the packed goods in storage bins, shuting baffles, assigning storage bins for merchandise type, associating empty storage bins as storage bins for customers, discharging the storage bins for merchandise type on a closed belt, storing into the storage bins for customers the previously discharged merchandise type on the closed belt, recovering the packed goods sequentially from the storage bins for each customer.

* * * * *

UNITED STATES PATENT AND TRADEMARK OFFICE
CERTIFICATE OF CORRECTION

PATENT NO. : 6,799,671 B1
DATED : October 5, 2004
INVENTOR(S) : Gomez

It is certified that error appears in the above-identified patent and that said Letters Patent is hereby corrected as shown below:

Column 6,
Line 50, must be changed to -- We describe below in greater detail the pallet emptier 47. --.
Lines 51-67, must be deleted.

Column 7,
Lines 1-25, must be deleted.
Line 47, must be changed to -- FIGS. 11-12. Said figures show the box emptier. All the --.

Signed and Sealed this

Fifteenth Day of November, 2005

JON W. DUDAS
*Director of the United States Patent and Trademark Office*